United States Patent [19]
Abbondonzio et al.

[11] Patent Number: 5,909,593
[45] Date of Patent: Jun. 1, 1999

[54] SYSTEM FOR ASSIGNING SNOOP LEVELS TO SNOOPER MODULES AND SELECTIVELY INVOKING SNOOPER MODULES HAVING SPECIFIED RELATION TO A SELECTED SNOOP LEVEL FOR HARDWARE DETECTION

[75] Inventors: Antonio Abbondonzio, Round Rock; Jon Alan Grimm, Austin, both of Tex.

[73] Assignee: International Business Machines Corporation, Armonk, N.Y.

[21] Appl. No.: 08/762,648

[22] Filed: Dec. 9, 1996

[51] Int. Cl.$^6$ ........................................... G06F 15/00
[52] U.S. Cl. ................... 395/839; 395/183.01; 395/284; 395/651; 395/830
[58] Field of Search ............................. 395/280, 185.09, 395/839, 828, 836, 282, 284, 651, 830, 183.01; 370/241

[56] References Cited

U.S. PATENT DOCUMENTS

| | | | |
|---|---|---|---|
| 4,866,712 | 9/1989 | Chao | 371/5.1 |
| 4,979,105 | 12/1990 | Daly et al. | 364/200 |
| 5,014,193 | 5/1991 | Garner et al. | 364/200 |
| 5,237,690 | 8/1993 | Bealkowski et al. | 395/700 |
| 5,367,640 | 11/1994 | Hamilton et al. | 395/275 |
| 5,386,567 | 1/1995 | Lien et al. | 395/700 |
| 5,535,415 | 7/1996 | Kondou et al. | 395/828 |

OTHER PUBLICATIONS

"Hardware Feature Detection and Configuration with Fail-safe Checkpointing", IBM Technical Disclosure Bulletin, vol. 38 No. 12 Dec. 1995, pp. 543–544.

Primary Examiner—Thomas C. Lee
Assistant Examiner—Albert Wang
Attorney, Agent, or Firm—Mark S. Walker

[57] ABSTRACT

An apparatus and method for detecting adapter cards and associated resources in an information handling system is disclosed. Snoop levels for controlling execution of one or more snooper software modules which detect adapter cards and associated resources and for controlling allocation of resources to the snooper software modules are provided. Each snoop level allows for varying degrees of resource allocation. Snoop levels are selected in response to whether any adapter cards have been removed from or added to the computer system, thereby restricting the amount of snooping which occurs to limit the risk of resource conflicts.

29 Claims, 2 Drawing Sheets

SYSTEM FOR ASSIGNING SNOOP LEVELS TO SNOOPER MODULES AND SELECTIVELY INVOKING SNOOPER MODULES HAVING SPECIFIED RELATION TO A SELECTED SNOOP LEVEL FOR HARDWARE DETECTION

FIELD OF THE INVENTION

The present invention relates generally to information handling systems, and apparatuses and methods for detecting adapter cards and associated resources in an information handling system. More specifically, the present invention relates to an apparatus and method for reducing the risk of resource conflicts and potentially hazardous side effects when detecting adapter cards and associated resources.

BACKGROUND OF THE INVENTION

There are many potentially hazardous side effects to detecting hardware adapters in current personal computers. Much of the risk is due to the inherently ad hoc detection methods used by system software. These methods are less than robust for non-PNP (Plug and Play) bus architectures. The PNP bus architectures, such as ISA PNP, Microchannel, and PCI, have designed-in hardware enumeration and dynamic resource allocation. Unfortunately, the majority of personal computer (PC) systems are in part non-PNP.

Intel x86 operating systems have accordingly devised many ad hoc algorithms for detecting hardware and their associated hardware resources, such as input/output (I/O) ports, interrupt request line levels (IRQ levels), and direct memory access (DMA) channels. In the execution of this "hardware snooping," an adapter may be placed into an unknown state which could have hazardous side effects to the operation of that adapter, the PC, or the software executing on the PC.

For example, a hardware detection module, referred to as a "snooper," may inadvertently use an I/O port decoded by an adapter, of which this snooper has no architectural knowledge. Since there are many hardware detection methods, or "snippets," and each cannot possibly have knowledge of all other adapters, there is a risk of potentially hazardous effects to a system's integrity. These effects might manifest themselves in an unpredictable fashion. Some of the most damaging effects could include data corruption, system hangs, or system software traps.

Additionally, the arrival of hybrid systems, which incorporate PNP architectures (such as ISA PNP), while retaining support for legacy adapters (non-PNP ISA), has increased the need for hardware detection methods to safely set the dynamically configurable PNP cards. The approaching prevalence of such systems into the marketplace warrants investigation into reducing the risk of such methods, from both system integrity and service cost standpoints.

Some prior art operating systems have a known hardware base and limit their hardware detection appropriately. Other prior art operating systems have a similar hardware detection phase and knowledge of previous detection. However, these operating systems take an all or nothing stance. The operating system either performs hardware detection or assumes the system is configured as was previously detected. Some prior art operating systems even allow a limited detection of a certain class of adapters (e.g., SCSI adapters, network interface cards, etc.) to help limit the scope of snooping.

Consequently, it would be desirable to have a method and apparatus for detecting adapter cards and associated resources in an information handling system which would reduce the risk of resource conflicts. In addition, it would be desirable to have a method and system which would limit the potentially hazardous side effects caused by detecting hardware adapters in the system.

SUMMARY OF INVENTION AND ADVANTAGES

Accordingly, the present invention provides a method for detecting adapter cards and associated resources in an information handling system comprising the steps of determining whether any adapter cards have been removed from or added to the information handling system; providing snooper levels for controlling execution of one or more snooper software modules which detect adapter cards and associated resources and for controlling allocation of resources to the snooper software modules; and selecting a snooper level in response to the determining step to thereby reduce the risk of resource conflicts.

The present invention also provides the computer program product implemented by a computer system which implements the method set forth above.

The present invention also provides a method for reducing the risk of resource conflicts when detecting adapter cards and associated resources in an information handling system wherein the method includes the steps of allocating the first set of resources to snooper modules in response to a first set of adapter cards in the information handling system and allocating a second set of resources to snooper software modules in response to a second set of adapter cards in the information handling system.

The present invention also provides a computer program product implemented in a computer system which implements the method set forth above.

The present invention further provides an information handling system which implements the methods set forth above.

The present invention provides the advantage of limiting the potentially hazardous side effects caused by detecting hardware adapters in computer systems. The present invention also provides the advantage of utilizing previously allocated resources to the adapter cards to thereby limit the need for allocation of new resources.

DETAILED DESCRIPTION OF A PREFERRED EMBODIMENT OF THE INVENTION

In the following description for purposes of explanation, specific program procedures, application programming interfaces (APIs), and configurations are set forth to provide a through understanding of the present invention. The preferred embodiment described herein is implemented within an OS/2 operating system created by IBM (OS/2 and IBM are registered trademarks of International Business Machines Corporation). However, it will be apparent to one skilled in the art that the present invention may be practiced without the specific details and may be implemented in various computer systems utilizing various operating systems and in various configurations or makes or models of tightly coupled processors or in various configurations of multi-processor systems. The procedural descriptions and representations which follow are the means used by those skilled in the art to most effectively convey the substance of their work to others skilled in the art. The detailed descriptions which follow are presented in terms of program procedures executed on or in an information handling system generically referred to as a computer or a network of computers.

Figure 1:
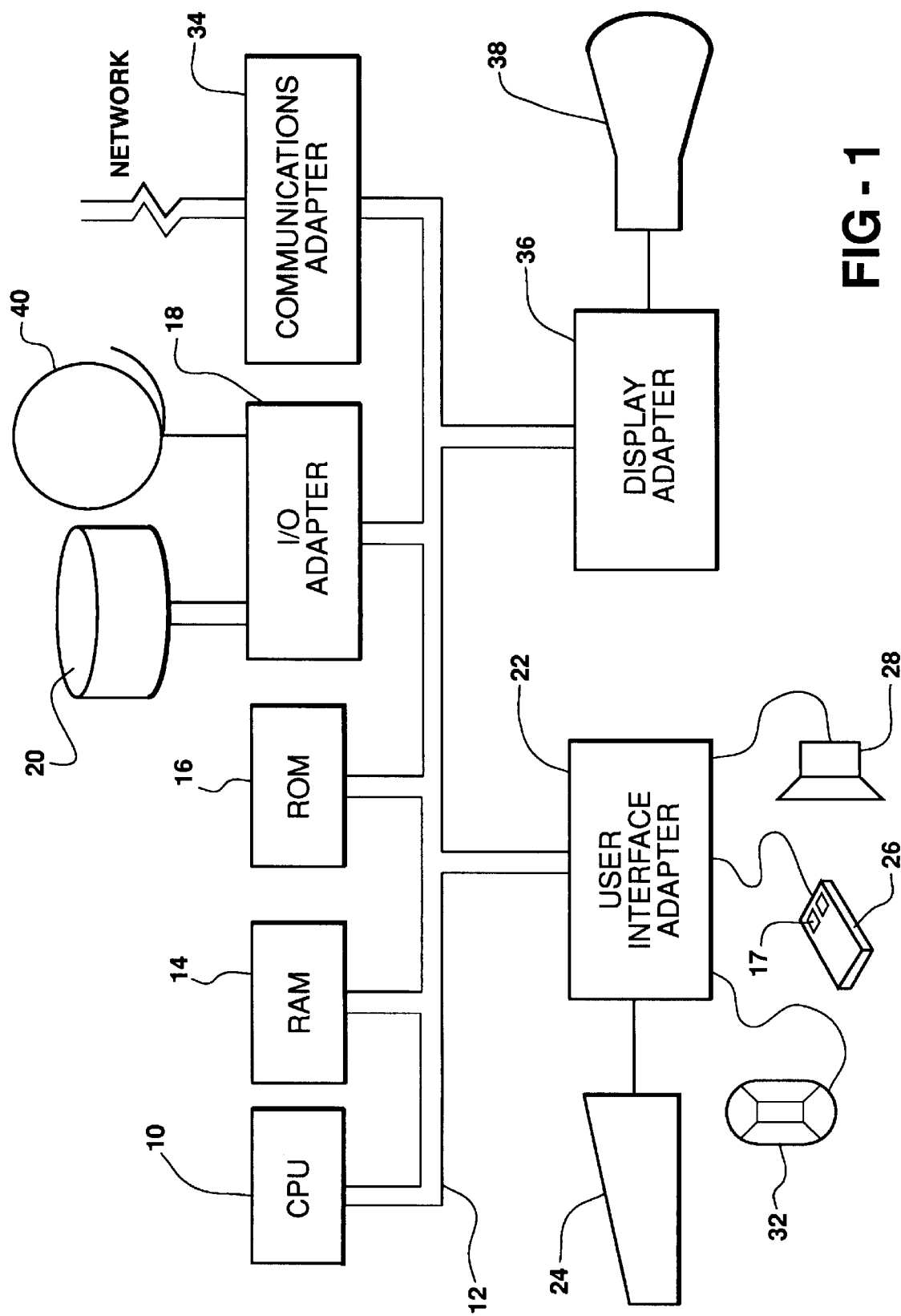
FIG. 1 is an information handling system embodying the present invention.

A representative hardware environment for practicing the present invention is depicted in FIG. 1 which illustrates a typical hardware configuration of a computer information handling system in accordance with the subject invention, having at least one central processing unit (CPU) 10. CPU 10 is interconnected via system bus 12 to random access memory (RAM) 14, read only memory (ROM) 16, and input/output (I/O) adapter 18 for connecting peripheral devices such as disk units 20 and tape drives 40 to bus 12, user interface adapter 22 for connecting keyboard 24, mouse 26 having button 17, speaker 28, microphone 32, and/or other user interface devices such as a touch screen device (not shown) to bus 12, communication adapter 34 for connecting the information handling system to a data processing network, and display adapter 36 for connecting bus 12 to display device 38.

Figure 2:
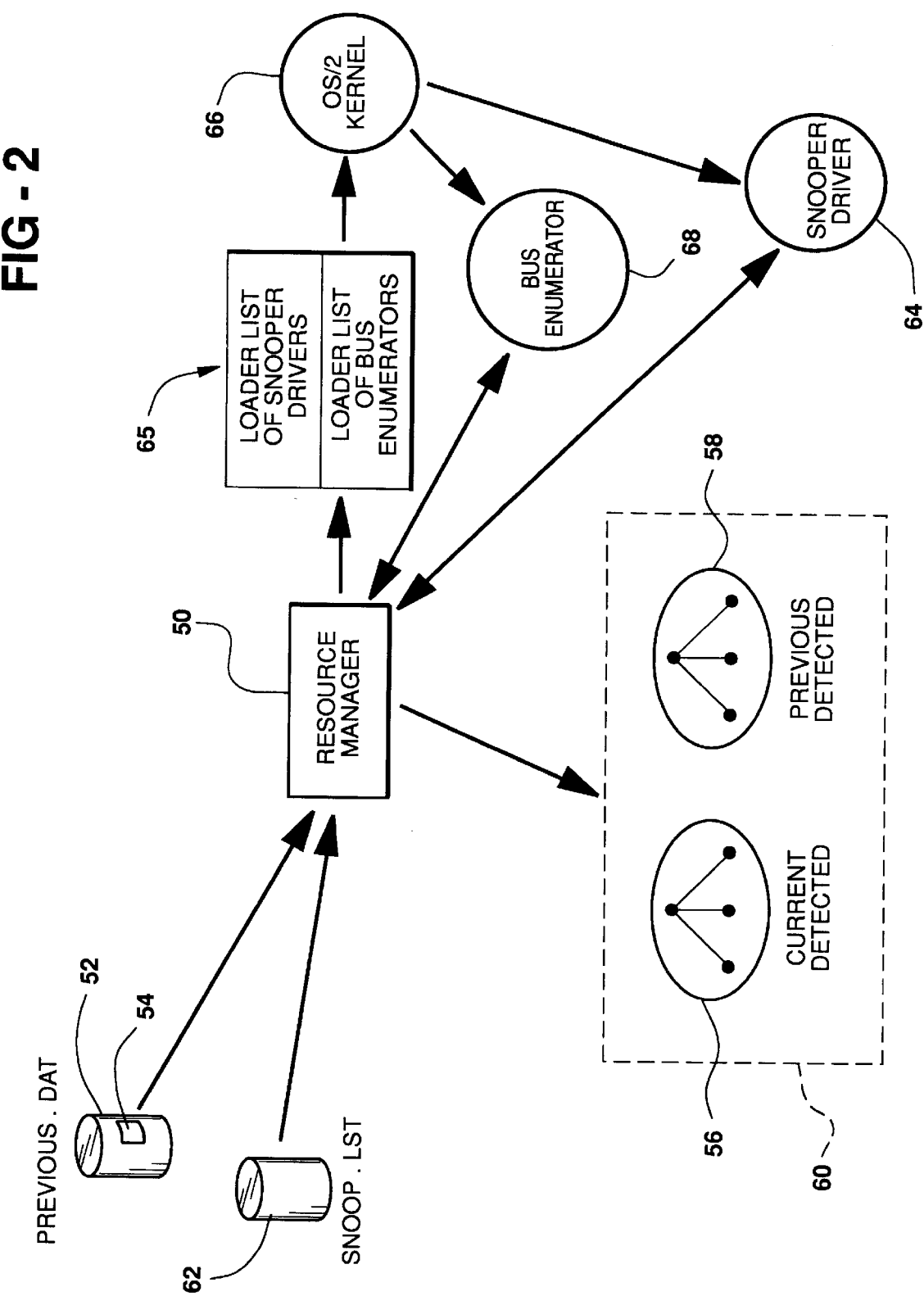
FIG. 2 is a conceptual illustration of a method and apparatus for detecting adapter cards and associated resources in an information handling system according to the present invention.

Now referring to FIG. 2, the apparatus and method according to the present invention will be described. The Resource Manager (RM) 50 is the central repository of all detected hardware and its I/O associated resources detected on the system. Resources must be allocated from RM 50 before snoopers may use them in their hardware detection schemes. Each snooper then records the hardware detected and its resources to RM 50. This information is stored in persistent storage, in this case in a file referred to as PREVIOUS.DAT 52, for use across boots of the system. The information stored in PREVIOUS.DAT 52 includes the detected hardware, its resources, and an identifier representing the snooper. A value referred to as the "snoop level" 54 is also stored in PREVIOUS.DAT 52, and is used for the next redetection of hardware.

Note that in OS/2, RM 50 has an internal representation of the detected hardware, stored in what is referred to as the "current detect tree" 56. It also has another structure representing the detected hardware from the previous round of snooping, referred to as the "previous detect tree" 58. Previous detect tree 58 is only initialized from persistent data stored in PREVIOUS.DAT 52. Both current detect tree 56 and previous detect tree 58 are stored in database 60. Database 60 may be implemented as a hierarchical, relational, object-oriented, or other type of database.

Another file stored in persistent storage is SNOOP.LST 62. SNOOP.LST 62 contains a list of snooper drivers that should be run for hardware detection at boot time.

At boot time, the OS/2 kernel 66 loads RM 50. RM 50 determines the snoop level 54 stored in PREVIOUS.DAT 52, and then creates previous detect tree 56 from the data stored in PREVIOUS.DAT 52. Next, RM 50 reads SNOOP-.LST 62 to determine which snoopers should be loaded. RM 50 then sends a list 65 of snoopers and bus enumerators to the snooper loader. The snooper loader is a loader residing in RM 50 and kernel 66. The snooper loader loads and executes the known snoopers according to the assigned snoop level 54. List 65 also contains a list of PNP drivers, referred to as bus enumerators 68, which are sent to kernel 66 to be executed. After execution, RM 50 creates current detect tree 56 from the detected hardware registered by bus enumerators 68 and snooper drivers 64. The currently detected hardware is also saved to PREVIOUS.DAT 52, along with the snoop level 54. An application could (however, does not currently) manipulate PREVIOUS.DAT 52 to change the behavior of the snoopers on the next boot. This would allow a knowledgeable user to change the resources used by a snooper. The user could then change the hardware accordingly and then boot the system on an appropriate snoop level.

There are several snoop levels, each defining a possible change in the hardware and a corresponding change to level of risk which must take place during hardware detection. These levels are described below.

Default Level (NO CHANGE IN HARDWARE)

The snooper loader will not run the snoopers. Therefore, there is no snooping. RM 50 will use the data found from the previous boot (stored in PREVIOUS.DAT 52) to populate its internal repository. PNP adapters, bus enumerators 68, are assigned the same resources as they were assigned in the previous boot.

Since no snoopers are run at this snoop level, both previous detect tree 58 and current detect tree 56 are initialized with identical data from the previous resource allocation information in PREVIOUS.DAT 52.

At this level, RM 50 will allow "RM-aware" device drivers, those adhering to a protocol of allocating resources from RM before using them, to only allocate resources that were assigned to them on a previous boot. This snoop level is not possible if the previous hardware detection data is not available.

Low Risk (ADAPTER REMOVAL)

This level allows the system to detect whether an adapter has been removed. A snooper is only allowed resources which previously belonged to it. Because snoopers are only allowed resources which are known to have belonged to them, the risk of hazardous effects is reduced. However, just enough risk is allowed to detect the removal of an adapter. PNP cards can then be configured. The removal of an adapter may free up resources which can then be assigned to an unconfigured PNP adapter.

Note that in OS/2, RM 50 uses its previous detect tree 58 to make a comparison to snooper resource allocation requests. Optimally, the snooper loader will not even execute snoopers which had not found any resources in the previous hardware detection. RM 50 will allow RM-aware drivers to only allocate resources that were assigned to them on a previous boot. This snoop level is not possible without previously detected hardware data.

PNP adapters are configured to values stored from the previous hardware detection data, as some software may be sensitive to the specific assignment of resources to an adapter. For example, DOS serial port communication software may be configured to do I/O to a certain I/O port range. A user would not want to reconfigure this software every time the hardware configuration changed.

Medium Risk (ADAPTER ADDITION)

This level allows the system to detect when an adapter has been inserted into a system. RM 50 will allow a snooper to allocate any resources previously allocated by this snooper or resources not previously allocated by any snooper. A snooper which had not previously had any resources would only be able to acquire resources not allocated by a current snooper or by any other snooper in a previous detection. The risk increases at this level due to the allocation of resources previously not claimed by any snooper. This scenario provides just enough risk to detect the addition of a new card. The level would also find the removal of a card. However, it is hoped the user would choose the lower risk level whenever possible. A more complicated scenario of inserting and removing adapters might also be detected if the adapters had non-common resources. However, this is a difficult scenario for a user to identify. As such, it would be recommended to use a high risk setting in such situations. If mistaken, a situation might occur, in which a new card will still not be identified, because it had belonged to a previously detected adapter.

PNP adapters can then be configured. Any new PNP adapter is detected and configured to a conflict free resource configuration.

Note that in OS/2, RM 50 uses the previously detected hardware data to determine when to allow the allocation of resources to a snooper. RM 50 will allow RM-enabled drivers to only allocate resources that were found by their adapter's snooper. This level is not possible without the previously detected hardware information.

High Risk (OS INSTALL, CHANGE CONFIGURATION)

At this level, all snoopers are run with no restrictions based on previous hardware scans. This is the default mode when the previously detected hardware data is not available, such as during the operating system installation. This is also used to detect complicated hardware configuration changes (i.e. multiple cards inserted and/or removed, or card reconfiguration). After the snoopers execute, all PNP adapters are configured to a conflict free resource configuration.

Note that if no previous configuration is available, PNP adapters can not be ensured of reconfiguration to previously assigned resources.

No Snooping or PNP Configuration

OS/2 also implements another snoop level, sometimes referred to as Warp Risk, as it mimics the behavior of an OS/2 Warp 3.0 system. On this version of OS/2 there were no snoopers. Snoopers are not executed to fill RM's 50 repository of known detected hardware. Appropriately, PNP adapters can not be safely configured, and are not, on this snoop level.

However, snooping still occurs in most device drivers, but RM 50 is not able to limit the device driver to its snooper's resources because there are no snoopers executed. This is actually the highest risk, but is typically not acceptable when the above risk levels are implemented. This might be slightly acceptable if PNP adapters are not on a system.

Thus, a present invention provides a method and apparatus for allowing a calculated risk based on a hardware configuration change. Only enough risk is allowed to account for the specified change in the system, limiting exposure to the potentially detrimental effects of hardware snooping by restricting the amount of snooping which occurs.

What is claimed is:

1. A method for detecting adapter cards and associated resources in an information handling system; said method comprising:

testing whether any adapter cards have been removed from or added to the information handling system;

assigning a snoop level to each of one or more snooper software modules that detect adapter cards and associated resources and for controlling allocation of resources to the snooper software modules; and selecting a snoop level in response to said testing steps;

executing each of said software modules only if the snoop level assigned said module bears a specified relation to said selected snoop level, thereby reducing the risk of resource conflicts.

2. The method, as recited in claim 1, wherein said assigning step includes the step of assigning a first snoop level wherein no snooper software modules are executed and no resources are allocated to the snooper software modules and wherein said selecting step includes the step of selecting the first snoop level when no adapter cards were removed from or added to the information handling system.

3. The method, as recited in claim 2, further comprising the step of assigning, to the adapters, the resources from a previous boot of the information handling system.

4. The method, as recited in claim 1, wherein said assigning step includes the step of assigning a second snoop level wherein one or more snooper modules are executed and only resources which were previously allocated to the snooper modules can be allocated to the snooper modules and, wherein said selecting step includes the step of selecting the second snoop level when an adapter card is removed from the information handling system.

5. The method, as recited in claim 1, wherein said assigning step includes the step of assigning a third snoop level wherein one or more snoop modules are executed and resources which were previously allocated to the snooper modules or resources not allocated can be allocated to the snooper modules and wherein said selecting step includes the step of selecting the third snoop level when an adapter card is added to the information handling system.

6. The method, as recited in claim 1, wherein said step includes the step of assigning a fourth snoop level wherein one or more modules are executed and all resources can be allocated to the snooper modules and wherein said selecting step includes the step of selecting the fourth snoop level when one or more adaptor cards are removed from or added to the information handling system.

7. The method, as recited in claim 6, further comprising the steps of defaulting to the fourth snoop level if there is no information on detected adapter cards and associated resources allocated to the adapter cards from a previous boot of the information handling system.

8. The method, as recited in claim 1, wherein said assigning step includes the step of assigning a fifth snoop level wherein no snooper modules will execute and all resources can be allocated and wherein said selecting step includes the step of selecting the fifth snoop level when the information handling system includes only legacy adapter cards.

9. The method, as recited in claim 1, further comprising the steps of:

inputting the snoop level;

loading the snooper modules to be executed in response to the snoop level;

requesting, by the snooper modules, allocation of resources;

comparing the resources requested for allocation to the resources allocated to the adapter cards from a previous boot of the information handling system; and allocating resources to the snooper modules in response to said comparing step and the snoop level.

10. The method, as recited in claim 1, further comprising the step of storing information on detected adapter cards and associated resources allocated to the adapter cards from a previous boot of the information handling system.

11. The method, as recited in claim 1, further comprising the step of storing the snoop level.

12. A computer program product comprising a program storage device readable by a computer system tangibly embodying a program of instructions executable by said computer system for detecting adapter cards and associated resources in said computer system, said program of instructions implementing the following method:

testing whether any adapter cards have been removed from or added to the computer system;

assigning snoop levels to each of one or more snooper software modules that detect adapter cards and associated resources and for controlling allocation of resources to the snooper software modules; and selecting a snoop level in response to said testing step;

executing each of said software modules only if the snoop level assigned said module bears a specified relation to said selected snoop level, thereby reducing the risk of resource conflicts.

13. The computer program product, as recited in claim 12, wherein said assigning step includes the step of assigning a first snoop level wherein no snooper software modules are executed and no resources are allocated to the snooper software modules and wherein said selecting step includes the step of selecting the first snoop level when no adapter cards were removed from or added to the information handling system.

14. The computer program product, as recited in claim 13, wherein said method further includes the step of assigning, to the adapters, resources from previous boot of the information handling system.

15. The computer program product, as recited in claim 12, wherein said assigning step includes the step of assigning a second snoop level wherein one or more snooper modules are executed and only resources which were previously allocated to the snooper modules can be allocated to the snooper modules and wherein said selecting step includes selecting the second snoop level when an adapter card is removed from the information handling system.

16. The computer program product, as recited in claim 12, wherein said assigning step includes the step of assigning a third snoop level wherein one or more modules are executed and resources which were previously allocated to the snooper modules or resources not allocated can be allocated to the snooper modules and wherein said selecting step further includes the step of selecting the third snoop level when an adapter card is added to the information handling system.

17. The computer program product, as recited in claim 12, wherein said assigning step further includes the step of assigning a fourth snoop level wherein one or more modules are executed and all resources can be allocated to the snooper modules and wherein said selecting step further includes the step of selecting the fourth snoop level when one or more adapter cards are removed from or added to the information handling system.

18. The computer program product, as recited in claim 17, wherein said method further comprises the step of defaulting to the fourth snoop level if there is no information on detected adapter cards and associated resources allocated to the adapter cards from a previous boot of the information handling system.

19. The computer program product, as recited in claim 12, wherein said assigning step include the step of providing a fifth snoop level wherein no snooper modules execute and all resources can be allocated and wherein said selecting step includes the step of selecting the fifth snoop level when the information handling system includes only legacy adapter cards.

20. The computer program product, as recited in claim 12, wherein said method further comprises the steps of:

inputting the snoop level;

loading the snooper modules to be executed in response to the snoop level;

requesting, by the snooper modules, allocation of resources;

comparing the resources requested for allocation to the resources allocated to the adapter cards from a previous boot of the information handling system; and allocating resources for the snooper modules in response to said comparing step and the snoop level.

21. An information handling system comprising one or more processors;

memory;

a system bus operably coupled to said processors and said memory;

one or more adapter cards and associated resources;

one or more snooper software modules for detecting adapter cards and associated resources used in said information handling system;

means for testing whether any adapter cards have been removed from or added to the information handling system;

means for providing snoop levels for controlling execution of said snooper software modules and for controlling allocation of resources to said snooper software modules; and means for selecting a snoop level in response to said means for testing to thereby reduce the risk of resource conflicts.

22. The information handling system, as recited in claim 21, wherein said means for providing snoop levels further includes means for providing a first snoop level wherein no snooper software modules are executed and no resources are allocated to the snooper software modules and wherein said means for selecting a snoop level further includes means for selecting said first snoop level when no adapter cards were removed from or added to the information handling system.

23. The information handling system, as recited in claim 22, further including means for assigning, to said adapters, resources from a previous boot of the information handling system.

24. The information handling system, as recited in claim 21, wherein said means for providing snoop levels includes means for providing a second snoop level wherein one or more snooper modules are executed and only resources which were previously allocated to the snooper modules can be allocated to the snooper modules and wherein said means for selecting a snoop level includes means for selecting said second snoop level when an adapter card is removed from the information handling system.

25. The information handling system, as recited in claim 21, wherein said means for providing snoop levels includes means for providing a third snoop level wherein one or more modules are executed and resources which were previously allocated to the snooper modules or resources not allocated can be allocated to the snooper modules and wherein said means for selecting a snoop level includes means for selecting said third snoop level when an adapter card is added to the information handling system.

26. The information handling system, as recited in claim 21, wherein said means for providing snoop levels includes means for providing a fourth snoop level wherein one or more modules are executed and all resources can be allocated to the snooper modules and wherein means for selecting a snoop level includes means for selecting said fourth snoop level when one or more adapter cards are removed from or added to the information handling system.

27. The information handling system, as recited in claim 26, further including means for defaulting to said fourth snoop level if there is no information on detected adapter cards and associated resources allocated to the adapter cards from a previous boot of the information handling system.

28. The information handling system, as recited in claim 21, wherein said means for providing snoop levels includes means for providing a fifth snoop level wherein no snooper modules execute and all resources can be allocated and wherein said means for selecting a snoop level includes means for selecting said fifth snoop level when the information handling system includes only legacy adapter cards.

29. The information handling system, as recited in claim 21, further comprising:

means for inputting the snoop level;

means for loading the snooper modules to be executed in response to the snoop level;

means for requesting, by the snooper modules, allocation of resources;

means for comparing the resources requested for allocation to the resources allocated to the adapter cards from a previous boot of the information handling system; and means for allocating resources to the snooper modules in response to said means for comparing and the snoop level.

* * * * *